United States Patent [19]

Schorum

[11] Patent Number: 5,105,393
[45] Date of Patent: Apr. 14, 1992

[54] SCR CONTROL FOR HIGH CURRENT DISCHARGE CIRCUIT

[75] Inventor: Stanley Schorum, Madison, Conn.

[73] Assignee: Science Accessories Corp., Stratford, Conn.

[21] Appl. No.: 495,337

[22] Filed: Mar. 19, 1990

[51] Int. Cl.$^5$ .................. G01S 15/00; H04R 17/00
[52] U.S. Cl. ........................ 367/99; 367/140;
        128/662.03; 73/596; 73/597
[58] Field of Search ................. 367/99, 140;
        128/661.02, 660.01, 662.03; 73/596, 597, 627;
        200/61.01, DIG. 20; 340/500

[56] References Cited

U.S. PATENT DOCUMENTS 3,731,273  5/1973  Hunt ............................. 340/16
3,872,858  3/1975  Hudson et al. ................. 73/67.9
4,156,304  5/1979  Lee ............................... 73/626
4,791,915  12/1988 Barsotti et al. ............... 128/24 A Primary Examiner—J. W. Eldred
Attorney, Agent, or Firm—Martin Novack

[57] ABSTRACT

The disclosure is directed to a circuit for producing electrical discharges in response to trigger signals, and a form of the disclosure is directed to an apparatus, which includes such a circuit, for determining the transit time of acoustic energy travel between a transmitter location and a receiver location. In a disclosed embodiment, means are provided for generating acoustic energy at the transmitter location in response to trigger signals, including: a transformer having primary and secondary windings; a transducer coupled to the secondary winding; a silicon controlled rectifier coupled in series arrangement with the primary winding; a capacitor coupled to said series arrangement of primary winding and silicon controlled rectifier; a source of electrical potential coupled to the capacitor; means for coupling the trigger signals to the gate electrode of the silicon controlled rectifier; and means responsive to said trigger signals for temporarily diverting current from said source away from the capacitor, primary winding, and silicon controlled rectifier. An acoustic receiver is provided at the receiver location. A timer is initialized when the acoustic energy is generated. The receipt of acoustic energy is detected at the receiver location and a terminating signal is generated in response thereto, the timer being terminated in response to the terminating signal. The time measured by the timer is indicative of the transit time of acoustic energy travel between said transmitter and receiver locations. For two or three dimensional digitizers, the position of a moveable element can be determined from transit times between one or more transmitters and one or more receivers.

8 Claims, 2 Drawing Sheets

SCR CONTROL FOR HIGH CURRENT DISCHARGE CIRCUIT

BACKGROUND OF THE INVENTION

This invention relates to high current discharge circuits that utilize a silicon-controlled rectifier (SCR) and, more particularly, to such circuits in which there is improved control over operation of the SCR. The invention is particularly, but not exclusively, useful in a sonic graphical digitizer.

Graphical digitizers are conventionally used to input graphical coordinate information, or the like, to a companion system. In a graphical digitizer, wave energy is typically passed between a movable element (such as a stylus or cursor) and one or more transducers located at fixed reference locations. The transit time of the wave energy traveling (in either direction) between the movable element and the reference locations is used in determining the position of the movable element in one, two, or three dimensions, typically in terms of digital coordinates. A type of graphical digitizer manufactured and sold by the assignee hereof, Science Accessories Corporation, measures the transit time of acoustic or sonic energy propagating through air. The transit time of sound traveling from a source on the movable element to each of a plurality of microphones is used, in conjunction with the velocity of sound in air and known geometrical relationships, to compute the position of the movable element.

In a sonic digitizer of the type described, a fast rise time pulse of acoustic energy is typically generated by applying a high voltage pulse to electrodes of a transducer, such as spark gap or a piezoelectric ceramic between capacitive plates. There is a high current discharge at the transducer which produces the desired sonic pulse. The type of circuit used to obtain the sonic pulse is illustrated in FIG. 1. A supply voltage, $V_s$, is utilized to charge a capacitor $C_1$ via a resistor $R_1$. The capacitor has a discharge path through the primary winding of transformer $T_1$ and a silicon controlled rectifier (labeled SCR), when the SCR is conductive. As is known in the art, trigger pulses are applied, at appropriate times, to the trigger gate electrode g of the SCR to render the SCR conductive and cause a pulse of relatively high voltage across the transformer secondary winding. A transducer such as a spark gap 125 is coupled across the secondary winding, and a quick discharge occurs at the transducer. When the SCR turns off, the capacitor can again be charged and awaits the next trigger pulse. The trigger pulse is also typically used to start the digitizer counters. [In my copending U.S. patent application Ser. No. 495,361, filed Mar. 16, 1990, and assigned to the same assignee as the present application, there is disclosed a technique for starting the counters in response to detection of the spark generation at the transducer.]

The type of circuit illustrated in FIG. 1 suffers from a fundamental problem; viz., the SCR, once turned on, cannot be turned off under the control of the gate lead. Instead, the anode-cathode current must be reduced below some minimum value, known as the "minimum holding current", for some period of time until its internal structure is cleared of stored charge and it turns off. Positive anode voltage can then once again be applied. For further information on this phenomenon, reference can be made to Section 1-5 of Motorola Catalog DL137, entitled "Thyristor Device Data".

In one prior approach to this problem, SCR turn-off was achieved by making $$V_{DC}/R_C < I_H$$

where $I_H$ is the holding current and can be empirically determined. This technique has the disadvantage that $I_H$ is so low that large values of $R_C$ are required. The time required to charge $C_D$ is consequently long, which limits the pulse generation rate.

Another proposed method of obtaining SCR turn-off was to replace the DC source voltage with a rectified sine wave from a 60 HZ power transformer. In this case, the supply voltage falls to zero every 8.33 ms, permitting operation with a lower value of $R_c$. This technique has a number of disadvantages, including: 1) low pass filtering cannot be interposed between the supply voltage and $R_c$, and transient primary current will be coupled back into the power transformer; 2) since the triggering rate and the line are asynchronous, charging time can vary, and at high pulsing rates, acoustic output can vary substantially from pulse to pulse; 3) no regulator can be interposed, and the acoustic output will vary with line and load variations of the power transformer.

A still further proposed approach to SCR turn-off makes use of a clamp diode at the anode of the SCR to convert the current flow in the transformer primary at the end of a pulse to a reverse current for a long enough period to turn off the SCR. This approach also has disadvantages. One such disadvantage is that it imposes some undesirable limitations on the component values that can be used in filtering the transformer secondary output. Another disadvantage is that if the electrodes of the secondary circuit are short circuited, the SCR can fail to turn off, which can burn out the primary circuit.

It is among the objects of the present invention to provide solution to the problems and limitations of the prior art as set forth.

SUMMARY OF THE INVENTION

The present invention is directed to a circuit for producing electrical discharges in response to trigger signals, and a form of the invention is directed to an apparatus, which includes such a circuit, for determining the transit time of acoustic energy travel between a transmitter location and a receiver location. In a disclosed embodiment, means are provided for generating acoustic energy at the transmitter location in response to trigger signals, including: a transformer having primary and secondary windings; a transducer coupled to the secondary winding; a silicon controlled rectifier coupled in series arrangement with the primary winding; a capacitor coupled to said series arrangement of primary winding and silicon controlled rectifier; a source of electrical potential coupled to the capacitor; means for coupling the trigger signals to the gate electrode of the silicon controlled rectifier; and means responsive to said trigger signals for temporarily diverting current from said source away from the capacitor, primary winding, and silicon controlled rectifier. An acoustic receiver is provided at the receiver location. Means are provided for initializing a timer when the acoustic energy is generated. Means are provided for detecting the receipt of acoustic energy at the receiver location and for generating a terminating signal in response thereto, the timer being terminated in response to the terminating signal. The time measured by the timer is indicative of the transit time of acoustic energy travel between said transmitter and receiver locations. For two or three dimensional digitizers, the position of a moveable element can be determined from transit times between one or more transmitters and one or more receivers.

In a preferred embodiment of the invention, the means for temporarily diverting current comprises an electronically controlled switch, for example a transistor. In this embodiment a diode is coupled between the source and the capacitor, the diode being arranged to permit current flow in the direction from said source toward the capacitor. Also in this embodiment, the means for temporarily diverting current further comprises means for generating, in response to the trigger signal, a control signal for closing the electronically controlled switch for a predetermined length of time.

Further features and advantages of the invention will become more readily apparent from the following detailed description when taken in conjunction with the accompanying drawings.

DESCRIPTION OF THE PREFERRED EMBODIMENT

Figure 2:
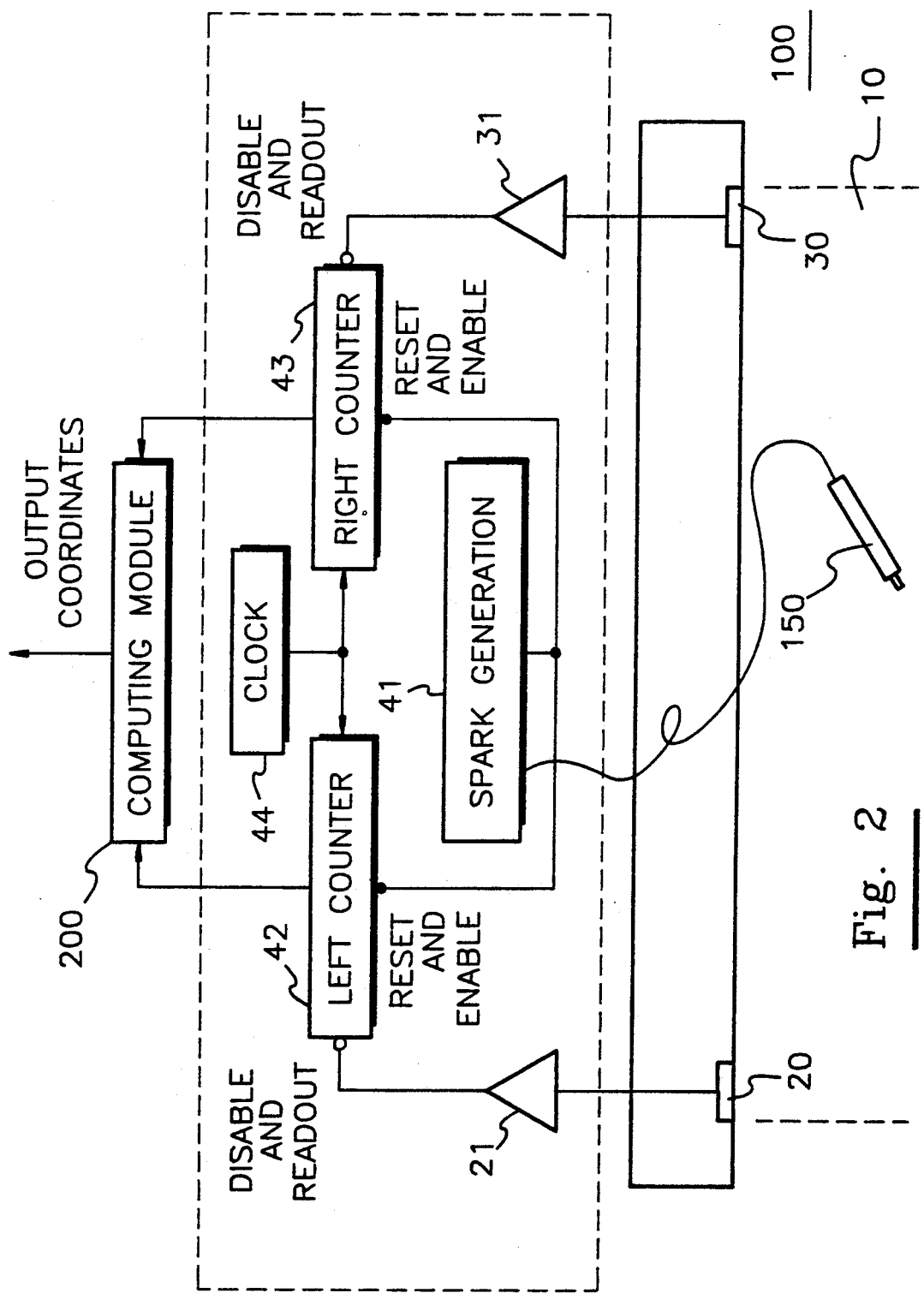
FIG. 2 is a block diagram, partially in schematic form, of an apparatus in which the improvement of the invention can be employed.

Referring to FIG. 2, there is shown an embodiment of an apparatus 100 in which the improvement of the invention can be employed, the apparatus being operative to determine the position of an element movable in a region 10 located to one side of the apparatus. In this illustration, the position of a movable element is determined in two dimensions, but it will be understood that the improvements described herein have application to position determination in one, two, or three dimensions, which utilizes any desired number or configuration of transmitters and receivers. The apparatus includes an elongated housing 110 which is positioned generally adjacent an edge of the region in which the position of a movable element 150 is to be determined. The housing 110 contains a pair of spaced apart transducers 20 and 30.

In the embodiment of FIG. 2, the transducers 20 and 30 are acoustic receivers, such as point microphones, and the movable element 150 is a stylus (or other suitable device), which contains a transducer for producing acoustic wave energy. The movable element may be, for example, a spark generating stylus of the type shown in U.S. Pat. No. 4,891,474, assigned to the same assignee as the present invention. Techniques for determining the position of a movable element sound emitter with respect to a pair of receivers, such as point microphones, are well known in the art, and reference can be made, for example, to U.S. Pat. No. 4,012,588, or to equipment known as Model GP-7 "GRAFBAR" manufactured and sold by Science Accessories Corporation, the assignee hereof, for description of operation of the type of equipment in which the improvements hereof can be utilized. Briefly, however, and as illustrated in FIG. 2, the travel time duration is determined by circuitry 40, shown for convenience in dashed line to the rear of housing 110, which comprises a left counter 42, associated with the left microphone 20, a right counter 43 associated with the right microphone 30, a clock 44, and a spark generation circuit 41. Coincident with generation of the spark at movable element 150 (and as indicated by a gating signal from circuit 41), the counters 42 and 43 are enabled to begin counting pulses from clock 44. Upon initial reception of the sound wavefront, the microphones 20 and 30, which generally receive the wavefront at different times, produce outputs which are amplified and filtered (as represented by the blocks 21 and 31), and utilized to disable the counters 42 and 43, and also to cause the readout of the respective counts which are indicative of the travel times between the sound source on the movable element and the microphones. [The equipment may also include a variable gain compensation circuit, as disclosed in copending U.S. patent application Ser. No. 476,662, filed Jan. 19, 1990, and assigned to the same assignee as the present Application.] The respective distances can then be computed, in known manner, by multiplying the travel times by the velocity of sound in air. This can be implemented, for example, by computing module 200, or any suitable dedicated or general purpose processor.

Figure 1:
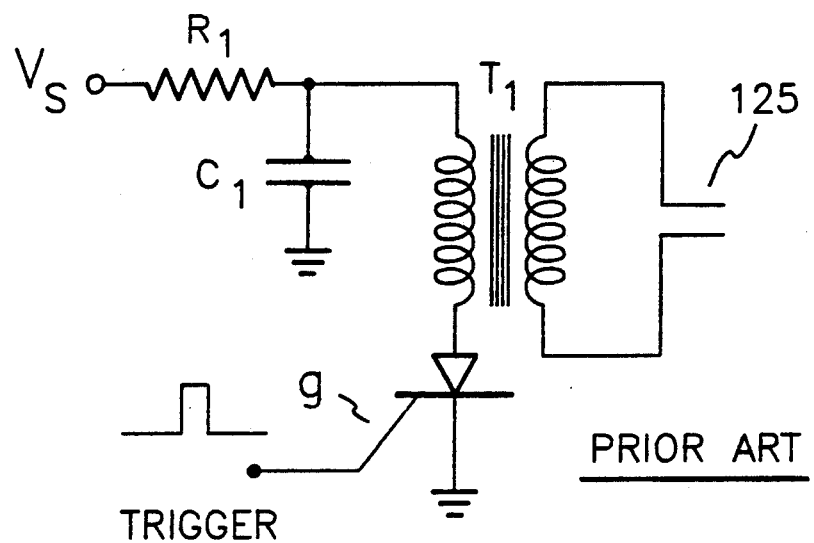
FIG. 1 is a circuit diagram of a prior art technique for generating sonic pulses for a sonic digitizer.
Figure 3:
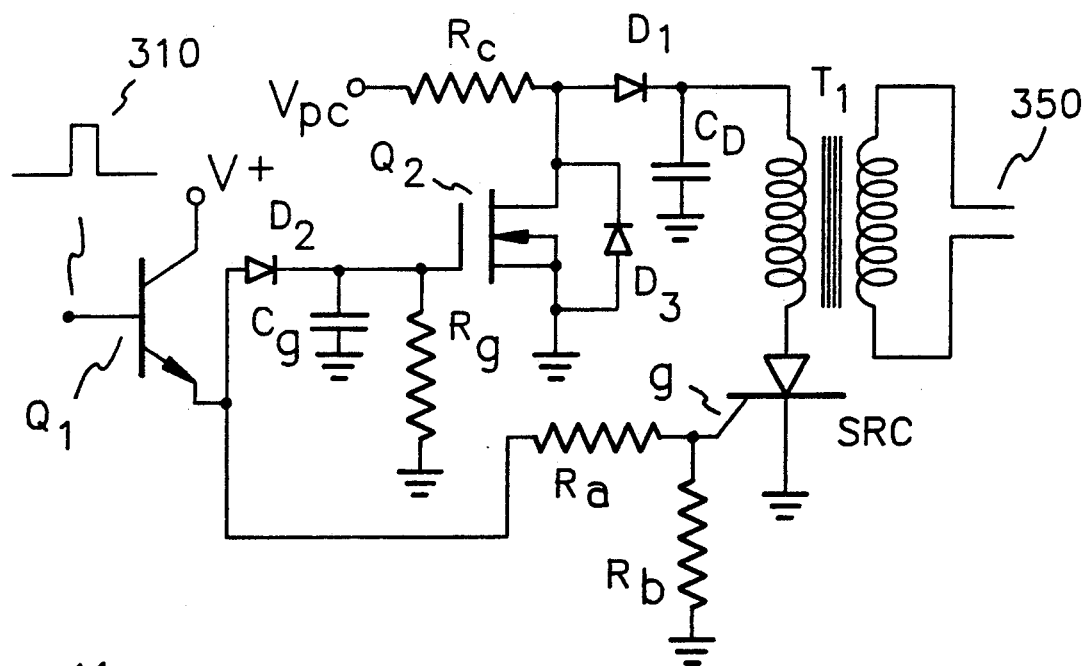
FIG. 3 is a schematic diagram of a circuit in accordance with the improvement of the invention.

FIG. 3 illustrates an embodiment of the circuit 41 as improved in accordance with the present invention. A source of DC voltage, $V_{DC}$, is coupled, via a resistor $R_C$, a diode $D_1$, and the primary winding of a transformer $T_1$, to the anode of a silicon controlled rectifier, labeled SCR. The cathode of the SCR is coupled to ground reference potential. A capacitor $C_D$ is coupled between one end of the primary winding and ground reference potential. The secondary winding of transformer $T_1$ is coupled to a transducer 350, which may be, for example, a spark gap electrode pair or a piezoelectric ceramic coupled between electrodes or between capacitive plates that are coupled to the transformer secondary.

An enabling signal 310 (e.g. from a switch on the stylus of FIG. 2 or from processor 200) is coupled to the base electrode of bipolar transistor $Q_1$. The collector electrode of transistor $Q_1$ is coupled to a positive bias voltage V+, and the emitter electrode of transistor $Q_1$ is coupled, via a voltage divider, to the gate electrode g of the SCR. The voltage divider includes series resistor $R_a$ and resistor $R_b$ coupled between the gate electrode and ground reference potential. The emitter electrode of transistor $Q_1$ is also coupled, via diode $D_2$, to the gate electrode of a field-effect transistor $Q_2$. A capacitor $C_g$ and a resistor $R_g$ are each coupled between the gate electrode of field-effect transistor $Q_2$ and ground reference potential. The source electrode of field-effect transistor $Q_2$ is coupled to ground reference potential, and the drain electrode of field-effect transistor $Q_2$ is coupled to the junction between resistor $R_c$ and diode $D_1$. Also, a diode $D_3$ is coupled between the drain and source electrodes of the field-effect transistor $Q_2$. In this circuit, the same enabling pulse (310) which turns on the SCR charges the interelectrode capacitances of the FET $Q_2$ and $C_g$ to a voltage V+, thereby also turning on $Q_2$. This pulse is "stretched" by the discharge of these capacitances through $R_g$, so the time it takes for $Q_2$ to turn off after the onset of 310 is determined by these values. Prior to receipt of the enabling signal 310, $C_D$ will charge, and the leading edge of signal 310 will turn on the SCR. $D_1$ prevents $Q_2$ from discharging $C_D$. As long as $Q_2$ is on, its drain current will thus come via $R_C$. In this condition, as long as:

$$(V_{DC}/R_C) R_{DS} \leq 0.5 \ V$$

(where $R_{DS}$ is the drain-to-source resistance of $Q_2$ when on), $D_1$ will not conduct appreciable current and the anode current of the SCR will be held below the holding current $I_H$. When the discharge of the gate circuit capacitances allows the gate voltage to fall below the threshold voltage of $Q_2$, it will turn off, allowing recharging of $C_D$ to begin. The SCR turn-off process is thus independent of the load, be it the transducer impedance or a short-circuit.

The invention has been described with reference to a particular preferred embodiment, but variations within the spirit and scope of the invention will occur to those skilled in the art. For example, it will be understood that other switching arrangements could be devised for diverting the current away from the SCR under control of the trigger signals.

I claim:

1. Apparatus for determining the transit time of acoustic energy travel between a transmitter location and a receiver location, comprising:
   means for generating acoustic energy at the transmitter location in response to trigger signals, including: a transformer having primary and secondary windings; a transducer coupled to said secondary winding; a silicon controlled rectifier coupled in series arrangement with said primary winding; a capacitor coupled to said series arrangement of primary winding and silicon controlled rectifier; a source of electrical potential coupled to said capacitor; means for coupling said trigger signals to the gate electrode of said silicon controlled rectifier; and means responsive to said trigger signals for temporarily diverting current from said source away from said capacitor, primary winding, and silicon controlled rectifier;
   an acoustic receiver at the receiver location;
   means for initializing a timer when said acoustic energy is generated;
   means for detecting the receipt of acoustic energy at the receiver location and for generating a terminating signal in response thereto, the timer being terminated in response to said terminating signal;
   whereby the time measured by the timer is indicative of the transit time of acoustic energy travel between said transmitter and receiver locations.

2. Apparatus as defined by claim 1, wherein said means for temporarily diverting current comprises an electronically controlled switch.

3. Apparatus as defined by claim 2, wherein said electronically controlled switch is a transistor.

4. Apparatus as defined by claim 3, further comprising a diode coupled between said source and said capacitor, said diode being arranged to permit current flow in the direction from said source toward said capacitor.

5. Apparatus as defined by claim 4, further comprising a resistor coupled between said source and said diode.

6. Apparatus as defined by claim 5, wherein said electronically controlled switch is coupled between the anode of said diode and ground reference potential.

7. Apparatus as defined by claim 1, wherein said source is a DC source.

8. Apparatus as defined by claim 2, wherein said means for temporarily diverting current further comprises means for generating, in response to said trigger signal, a control signal for closing said electronically controlled switch for a predetermined length of time.

* * * * *